(12) United States Patent
Krebs

(10) Patent No.: US 8,108,327 B2
(45) Date of Patent: Jan. 31, 2012

(54) METHOD AND SYSTEM FOR AN ADAPTIVE LEARNING STRATEGY

(75) Inventor: Rouven Krebs, Weingarten (DE)

(73) Assignee: SAP AG, Walldorf (DE)

( * ) Notice: Subject to any disclaimer, the term of this patent is extended or adjusted under 35 U.S.C. 154(b) by 675 days.

(21) Appl. No.: 12/211,098

(22) Filed: Sep. 15, 2008

(65) Prior Publication Data

US 2010/0070443 A1  Mar. 18, 2010

(51) Int. Cl.
*G06F 15/18* (2006.01)
*G06E 1/00* (2006.01)

(52) U.S. Cl. ........... 706/14; 707/737; 473/206; 473/220
(58) Field of Classification Search ...................... 706/14
See application file for complete search history.

(56) References Cited

U.S. PATENT DOCUMENTS

2007/0248938 A1 * 10/2007 Ronald .......................... 434/178
2009/0248667 A1 * 10/2009 Zheng et al. ...................... 707/5

* cited by examiner

*Primary Examiner* — Omar Fernandez Rivas
*Assistant Examiner* — Kalpana Bharadwaj
(74) *Attorney, Agent, or Firm* — Kenyon & Kenyon LLP

(57) ABSTRACT

A system and method for a computer-based training in which a user is presented with a first training session associated with a learning strategy. Quantitative data concerning the first training session is gathered and evaluated to determine the effectiveness of the learning strategy for the user. A user is presented with a second training session associated with a different learning strategy based on the determined effectiveness of the first learning strategy.

17 Claims, 4 Drawing Sheets

METHOD AND SYSTEM FOR AN ADAPTIVE LEARNING STRATEGY

BACKGROUND

People learn in many different ways. For example, some people learn best by seeing (i.e., visual learning), while others learn best by hearing (i.e., verbal or auditory learning) or by doing (i.e., kinetic learning). Whereas some people prefer inductive learning (that is, a bottom-up, detail-to-overview or specific-to-general approach), others prefer deductive learning (that is, a top-down, overview-to-detail or general-to-specific approach). Some people prefer to passively absorb knowledge imparted by others, while others prefer to actively discover knowledge on their own. And whereas some people prefer theoretical explanations, others prefer practical examples. The list goes on-numbers, pictures, tasks, repetition, even physical movement-may all affect (positively or negatively) an individual's learning effectiveness.

Thus, different learning strategies have emerged to accommodate the learning preferences of a given person. When designing an educational course, a training author may orient all or part of the material toward, for example, visual, verbal or kinetic learning; inductive or deductive learning; passive or active learning; or theory-based or example-based learning. Moreover, the training author may combine elements of one learning strategy with elements of another learning strategy, for example to accommodate verbal passive learners. Further learning preferences and strategies are also known in the art.

The same principles have been applied to computer-based training (CBT), also known as e-learning, which usually runs in an environment or using an environment called a learning management system or e-learning system. These systems must also support the learning strategies described above. Traditionally, a CBT course comprises a number of sections, wherein each section may target a specific learning strategy or strategies, for example theory-based learning or theory-based, inductive learning. The training author creates metadata for each section that identifies the learning strategy or strategies associated with that section. When the student-user begins the course, he or she selects a preferred learning strategy or strategies. Based on the student-user's selection, the CBT system uses the predefined metadata to automatically generate a static "path" of sections through the training data.

For example, suppose a training author wished to teach five concepts, with each concept being taught using either an example-based or theory-based learning strategy. The training author would create ten sections, one example-based and one theory-based for each of the five concepts. Each section would be described by metadata indicating whether the section were example-based or theory-based. The training author could also optionally create, for example, an overview section through which all student-users would progress, regardless of their preferred learning strategy. Suppose further, for example, that a student-user selected a theory-based learning strategy. At that time, the CBT system would create a path of six sections—the overview section and each of the five theory-based sections—through which that user would progress to complete the training course.

Although the traditional system allows a student-user to choose his or her preferred learning strategy, it may still result in an inappropriate or suboptimal learning strategy for that user. For example, a student-user may not know which strategy best complements his or her learning style. Also, the student-user may not understand how his or her choice affects the individualized presentation of material. For whatever reason, the student-user may select a learning strategy at random. If an inappropriate or suboptimal learning strategy is thus chosen, then the student-user may not learn the material as thoroughly or efficiently as possible.

One alternative to the traditional CBT learning strategy selection method is a variety of standards and specifications which support a feature usually called sequencing. Using one of these standards, a training author may build predefined paths through the training content, possibly influenced by predefined conditions. Thus, rather than a static path created at the start of training, these standards enable a dynamic path based on an individual student-user's progression through the training.

For example, suppose that the training author wished to teach five concepts, with each concept being taught using either an example-based or theory-based learning strategy. The training author would again create ten sections, one example-based and one theory-based for each of the five concepts. The training author could again also optionally create, for example, an overview section for all student-users. However, rather than the student-user selecting a learning strategy, the training author could manually predefine paths based on certain conditions, for example test results. Thus, for example, the training author could specify that if a student-user scored 60% or higher on the content mastery test after completing the example-based section for Content 1, then the example-based section for Content 2 should be used. On the other hand, the training author could also specify, for example, that if a student-user scored under 60% on the content mastery test after completing the example-based section for Content 1, then the theory-based section for Content 2 should be used. Thus, the path of sections through which that user would progress would depend on his or her performance on each content mastery test.

Although these standards allow dynamic generation of a path through the training material, they still present several drawbacks. First, the training author using such a standard must manually define the paths when creating the course. For example, if the training author wishes to use content mastery test results as a condition for determining the next learning strategy section, then the author must explicitly account for all possible content mastery test results and define how each result affects which learning strategy to use for the next concept. Second, the student-user may not explicitly change the learning strategy. For example, if a student-user knows he or she learns best by example but if a given example-based section is unclear, the student-user may score poorly on the content mastery test for that section and be wrongly directed to a theory-based section for the next concept. Third, the system may not automatically switch among learning strategies during runtime. For example, if the training author defines inappropriate or suboptimal conditions affecting the path, the system may not change the author's definitions in order to create a more appropriate learning path for the student-user. Fourth, the system does not use information from other trainings to compute a suitable path. Thus, for example, the system may not apply knowledge about the student-user's preferred learning strategy or strategies acquired during previous trainings completed by that student-user.

Thus, the need exists for an enhanced CBT system that dynamically provides adaptive learning strategies for each individual student-user.

DETAILED DESCRIPTION

Figure 1:
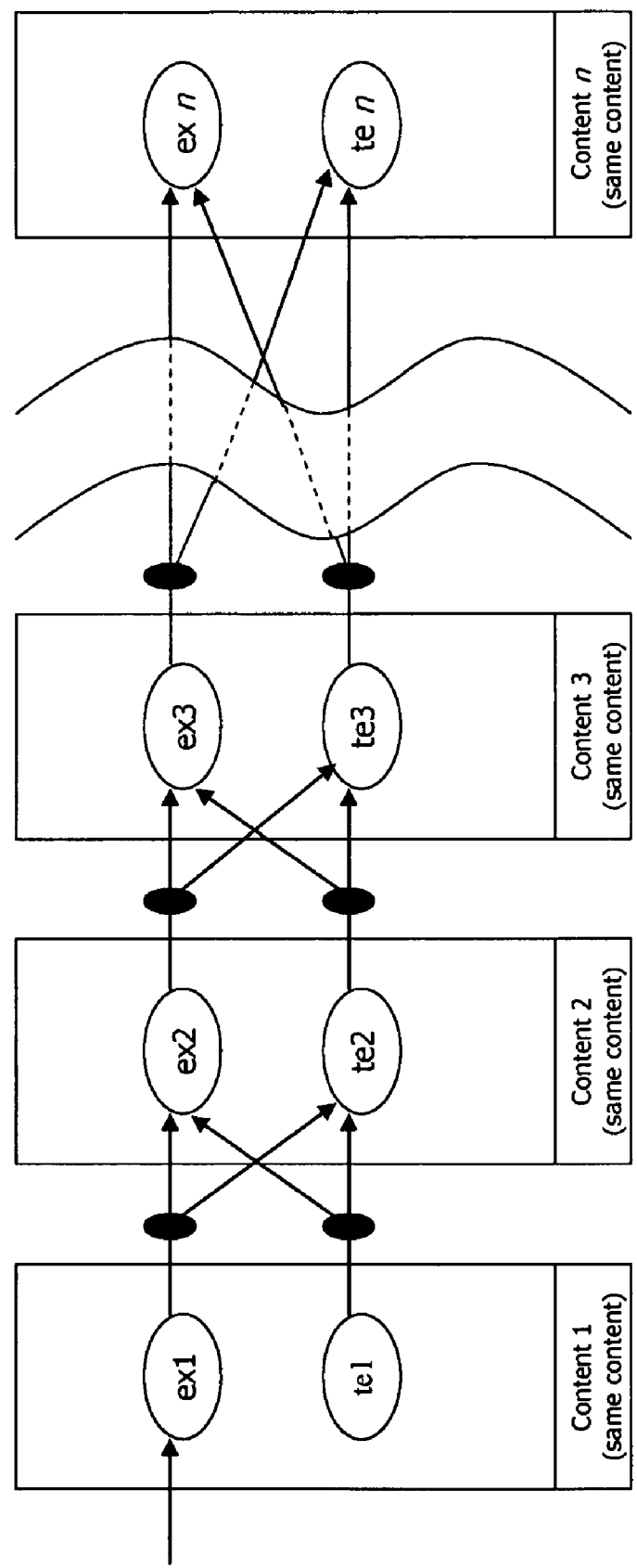
FIG. 1 illustrates an example embodiment of the present invention wherein the system uses the last user feedback to determine the learning strategy with which to associate the next section.

The present invention enhances existing CBT systems by providing an adaptive learning strategy wherein the system determines which strategy is best for a student-user. Rather than the author manually describing the path or the system generating a static path of sections, example embodiments of the present invention create an initial path or section thereof and dynamically change or add to it based on user feedback upon completing each section. That is, the system may switch among learning strategies during runtime in response to user behaviors. The system may also store user-specific data and reuse it for future training or if the current training is restarted or resumed. This user-specific data may be used, for example, to initiate a CBT session or to gather or evaluate user feedback, as discussed below.

Example embodiments of the present invention provide an adaptive learning strategy based on a student-user's feedback upon completing each section. Such user feedback may comprise information used to evaluate the suitability of one or more sections (e.g., the last section or last n sections) or learning strategies to a given user. For example, a system may compare user feedback from the last two sections to evaluate the positive or negative impact of any changes to the learning strategy or strategies, or to the underlying principles or assumptions guiding path generation or modification.

Example embodiments of the present invention provide several ways to gather student-user feedback. For example, example embodiments of the present invention may gather directed feedback from the student-user. That is, after every section, example embodiments of the present invention would ask the user how well the section explained the material. Example embodiments of the present invention may further compare the student-user's response with, for example, the average of all student-user responses to evaluate both the appropriateness of a learning strategy for a certain student-user and the objective quality of the section. Example embodiments of the present invention may further consider how the student-user's historical feedback scores compare with the average of all student-user responses when evaluating the appropriateness of a learning strategy.

For example, suppose a student-user completed a theory-based section. Upon being asked how well the section explained the material, suppose the student-user responded with a 50% positive rating. Suppose further that the average feedback for all users for that section was 60% positive. The relatively low response for that user (50%) compared to the average response (60%) might indicate that theory-based explanations are inappropriate for this user, so that the system should switch to example-based explanations for this user. On the other hand, if that user had routinely submitted lower feedback than the average response, this relatively low user response may simply indicate that the user criticizes each section more harshly.

Conversely, if the average feedback for all users for that section were 40% positive, this relatively low average feedback might indicate that the explanation of content in that section was objectively poor and should be improved. However, the relatively high response for that user (50%) compared to the average response (40%) might indicate that theory-based explanations are appropriate for this student-user. On the other hand, if that user had routinely submitted higher feedback than the average response, this relatively high user response may simply indicate that the user criticizes each section more mildly.

Example embodiments of the present invention may also gather user feedback through content mastery tests. That is, after every section, example embodiments of the present invention would provide a test to evaluate how well the student-user learned the material in that section. Example embodiments of the present invention may further compare the student-user's test score for that section with, for example, the average of all student-user test scores for that section to evaluate both the appropriateness of a learning strategy for a certain student-user and the objective quality of the section. Example embodiments of the present invention may further consider how the student-user's historical content mastery test scores compare with the average of all student-user responses when evaluating the appropriateness of a learning strategy.

For example, suppose a student-user completed a theory-based section and scored 50% correct on the content mastery test for that section. Suppose further that the average test score for all users for that section was 60% correct. The relatively low score for that user (50%) compared to the average score (60%) might indicate that theory-based explanations are inappropriate for this user, indicating that the system should switch to example-based explanations for this user. On the other hand, if that user's content mastery test scores were routinely lower than average, this relatively low score may simply reflect the student-user's historically inferior test scores.

Conversely, if the average score for all users for that section were 40% correct, this relatively low average score might indicate that the explanation of content in that section was objectively poor and should be improved. However, the relatively high score for that user (50%) compared to the average score (40%) might indicate that theory-based explanations are appropriate for this student-user. On the other hand, if that user's content mastery test scores were routinely higher than average, this relatively high score may simply reflect the student-user's historically superior test scores.

Example embodiments of the present invention may also include content mastery test questions directed toward multiple learning strategies. For example, a content mastery test may include some theory-based questions and some example-based questions. This would provide more feedback to the system, enabling more complex decisions concerning the learning path.

Example embodiments of the present invention may also gather user feedback through tracking the time that a student-user needs to complete each section. Example embodiments of the present invention may further compare the time a student-user needed to complete a section with, for example, the average time that student-user needed to complete other sections of similar length and difficulty to evaluate the appropriateness of a learning strategy for that student-user. Example embodiments of the present invention may also compare the time a student-user needed to complete a section with, for example, the average time required by all student-user test scores to complete that section (or other sections of similar length and difficulty) to evaluate both the appropriateness of a learning strategy for a certain student-user and the objective quality of the section. Example embodiments of the present invention may further consider how the time historically required by that student-user to complete sections compares with the average time required by all student-users when evaluating the appropriateness of a learning strategy.

For example, suppose a student-user required twenty minutes to complete a given theory-based section. Suppose further that the same student-user had required an average of only fifteen minutes to complete example-based sections of similar length and difficulty. The relatively long time required for that section (20 minutes) compared to the average time required for other sections (15 minutes) might indicate that theory-based explanations are inappropriate for this student-user. Conversely, if the student-user had required an average of twenty-five minutes to complete example-based sections of similar length and difficulty, the relatively short time required for that theory-based section (20 minutes) compared to the average time required for other sections (25 minutes) might indicate that theory-based explanations are more appropriate for this student-user.

For example, suppose a student-user required twenty minutes to complete a given theory-based section. Suppose further that the average time required by all users to complete that same section (or another section of similar length and difficulty) was only fifteen minutes. The relatively long time the student-user required to complete that section (20 minutes) compared to the average time required by all student-users to complete that section (or another section of similar length and difficulty) might indicate that theory-based explanations are inappropriate for this student-user. On the other hand, if that user routinely required more time than average to complete sections, this relatively long time requirement may simply reflect the student-user's historically slower completion rate.

Conversely, if the average time required by all users to complete that same section (or another section of similar length and difficulty) was twenty-five minutes, the relatively short time the student-user required to complete that section (20 minutes) compared to the average time required by all student-users to complete that section (or another section of similar length and difficulty) might indicate that theory-based explanations are more appropriate for this student-user. On the other hand, if that user routinely required less time than average to complete sections, this relatively short time requirement may simply reflect the student-user's historically faster completion rate.

In addition to the methods described above, the present invention also contemplates other ways to gather user feedback, such as through biometrical information like eye movement or brain waves. Additional methods for gathering user feedback will be apparent to those of ordinary skill in the art.

Once the user feedback has been gathered, example embodiments of the present invention allow several ways to interpret student-user feedback and select a learning strategy or strategies for the next section. For example, example embodiments of the present invention may interpret user feedback so that the last feedback controls the learning strategy selected for the next section. That is, after the user completes each section and submits feedback as, for example, in one of the embodiments described above, the system uses the student-user feedback for that section to determine whether to switch learning strategies. In example embodiments, the initial learning strategy may be decided at random, stored from a previous session, or determined based on pre-programmed preferences or information known about the user.

FIG. 1 illustrates an example embodiment of the present invention wherein the last feedback controls the learning strategy selected for the next section. In this example, the training teaches n concepts, each using either an example-based ("ex#") explanation or theory-based ("th#") explanation. After the student-user completes each section, the system chooses the learning strategy indicated by that section's user feedback as the learning strategy for the next section. Thus, for example, if a student-user completed section ex1 and the user feedback indicated that the user preferred theory-based learning, the system would then choose section te2 as the next section.

Figure 2:
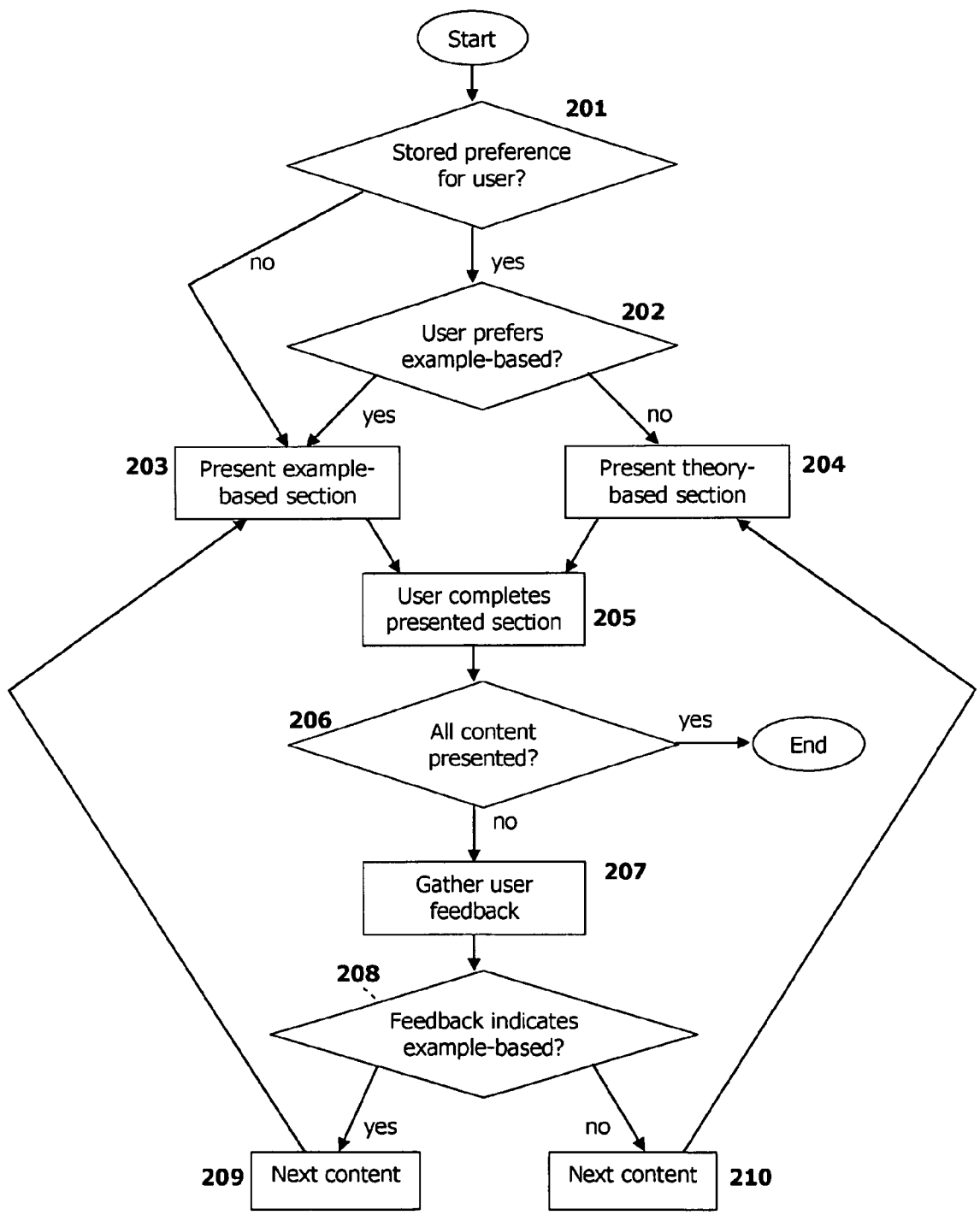
FIG. 2 illustrates an example embodiment of the present invention wherein the system uses a state machine to determine the learning strategy with which to associate the next section.

FIG. 2 illustrates an example in which the last user feedback controls the learning strategy for the next section, according to an example embodiment of the present invention.

In step 201, the system determines whether there is a "preferred" learning strategy stored for the current student-user. This preference may be stored, for example, based on the student-user's feedback from a previous training session. If there is a stored preference for this student-user, then step 202 determines whether the stored preference is for example-based learning. If so, then the system presents an example-based section for the current content as in step 203. If not, then the system presents a theory-based section for the current content as in step 204. If, however, no preference is stored for the current student-user, then the illustrated system presents an example-based section for the current content as in step 203. Other example embodiments, however, may present a theory-based section or select a section associated with the current content module at random to present if no preference is stored for the current student-user.

In step 205, the student-user completes the section presented in either step 203 or step 204. In step 206, the system determines whether all content modules in the training program have been presented, i.e., whether the just-completed section is associated with the final content module of the training program. If there are no more content modules to present, then the process ends; if not, then the system gathers feedback from the student-user as in step 207. This feedback may be gathered, for example, using any of the methods described above, or using any other methods available in the art. In step 208, the system determines whether the feedback indicates that the student-user prefers example-based learning. If so, then the system moves to the next content module (step 209) and presents an example-based section for that next content module, as in step 203. If, however, the system determines in step 208 that the student-user prefers theory-based learning, then the system moves to the next content module (step 210) and presents a theory-based section for that next content module, as in step 204. In this way, the process repeats from step 203 or 204 until step 206 determines that all content modules in the training program have been presented.

Example embodiments of the present invention may also interpret user feedback using a mechanism similar to a control loop, for example a PI(process+integral)-Controller, a PID(process+integral+derivative)-Controller, or any other control loop mechanism known in the art. In example embodiments, a target feedback score is set, for example, based on the average of all user feedback scores for a section or on the average of a student-user's feedback scores for other sections, each as described above. A positive difference between the user's actual feedback for a section and the target feedback for that section may indicate a preference for the current learning strategy, whereas a negative difference may indicate a preference for a different learning strategy.

For example, suppose a target feedback score for a particular example-based section is 60%. Suppose further, for example, the user's actual feedback score for this section were 70%. This would result in a positive difference of 17% (+10% difference divided by 60% target). This positive difference would then be added to a default figure (for example, zero), resulting in a positive difference of 17%, which would indicate that the student-user favors example-based learning. On the other hand, suppose that the user's actual feedback score were 50%. This would result in a negative difference of 17% (−10% difference divided by 60% target), which would indicate that the student-user favors theory-based learning. Other ways of calculating the positive or negative difference are also contemplated.

Figure 3:
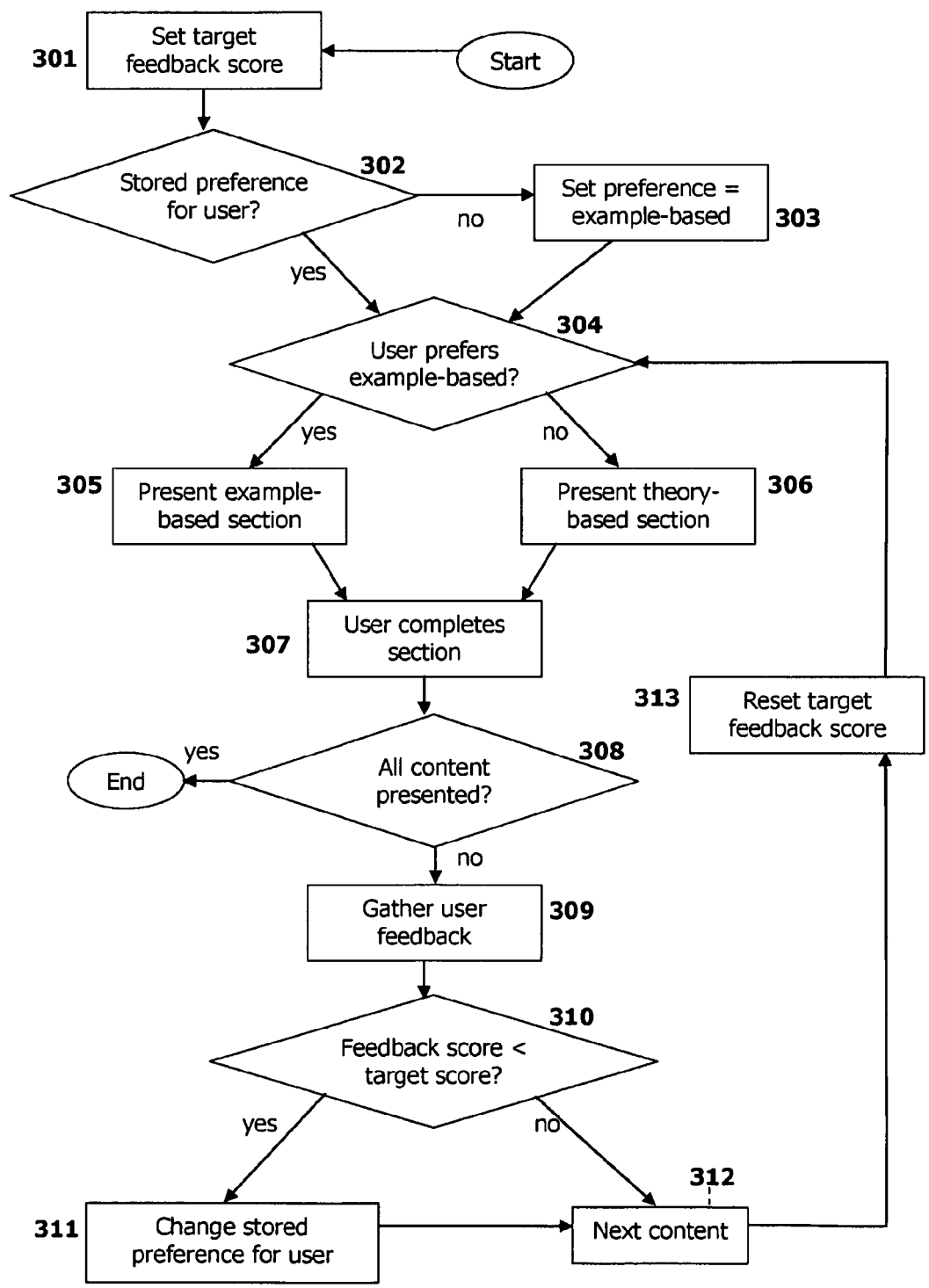
FIG. 3 illustrates an example process for using the last user feedback to determine the learning strategy with which to associate the next section, according to an example embodiment of the present invention.

FIG. 3 illustrates an example in which target scores are used to determine the learning strategy for the next section, according to an example embodiment of the present invention.

In step 301, the system calculates and/or retrieves a target feedback score for the first content module. This target feedback score may be calculated, for example, based on the average of all user feedback scores for that module or on the average of a student-user's feedback scores for other modules, each as described above. In step 302, the system determines whether there is a "preferred" learning strategy stored for the current student-user. This preference may be stored, for example, based on the student-user's feedback from a previous training session. If there is no stored preference for this student-user, then step 303 sets the student-user's preference to, in the illustrated example, example-based learning. Other example embodiments, however, may set the student-user's preference to theory-based learning or to a learning strategy selected at random. After step 302 or, where necessary, step 303, the system determines whether the student-user's stored preference is for example-based learning, as shown in step 304. If so, then the system presents an example-based section for the current content as in step 305. If not, then the system presents a theory-based section for the current content as in step 306.

In step 307, the student-user completes the section presented in either step 305 or step 306. In step 308, the system determines whether all content modules in the training program have been presented, i.e., whether the just-completed section is associated with the final content module of the training program. If there are no more content modules to present, then the process ends; if not, then the system gathers feedback from the student-user as in step 309. This feedback may be gathered, for example, using any of the methods described above, or using any other method known in the art. In step 310, the system determines whether the student-user's feedback score is less than the current target score, which was initially set in step 301. If so, then the system changes the stored preference for that student-user at step 311. For example, if the student-user's stored preference was for example-based learning, but his or her feedback score for the section presented in step 305 was less than the target score, then the system would change the student-user's stored preference to theory-based learning. Conversely, if the student-user's stored preference was for theory-based learning, but his or her feedback score for the section presented in step 306 was less than the target score, then the system would change the student-user's stored preference to example-based learning.

After step 310 or, where necessary, step 311, the system moves to the next content module (step 312) and in step 313 resets the target feedback score based, for example, on the average of all user feedback scores for that next module or on the average of a student-user's feedback scores for other modules, each as described above. The process then repeats from step 304, except that the comparison in step 310 uses the target score reset in step 313 rather than the initial target score set in step 301. In this way, the process repeats until step 308 determines that all content modules in the training program have been presented.

In example embodiments, the system accumulates differences over multiple sections to determine which learning strategy to use in the future. That is, rather than basing the learning strategy on feedback from a single section, the system may track and accumulate feedback calculations from some or all previous sections. For example, the system may use the equation:

$$X = \operatorname{sum}((S_0, \ldots, S_{t-1}, S_t)/n) * W1 + S_t * W2$$

to calculate the overall feedback score difference for the last n sections, where $S_t$ is the feedback calculation result for section t, and W1 and W2 are weighting (i.e., proportional) values as generally known in the control loop art. Here, for example, if $X>0$ for an example-user's based section, then the next section should be example-based. On the other hand, if $X<0$ for an example-based section, then the next section should be theory-based.

Example embodiments of the present invention interpret user feedback using a mechanism similar to a state machine. That is, after the user completes each section and submits feedback as, for example, in one of the embodiments described above, the system applies the feedback to the state machine to determine whether to switch learning strategies. In example embodiments, the initial learning strategy may be decided at random, stored from a previous session, or determined based on pre-programmed preferences or information known about the user.

Figure 4:
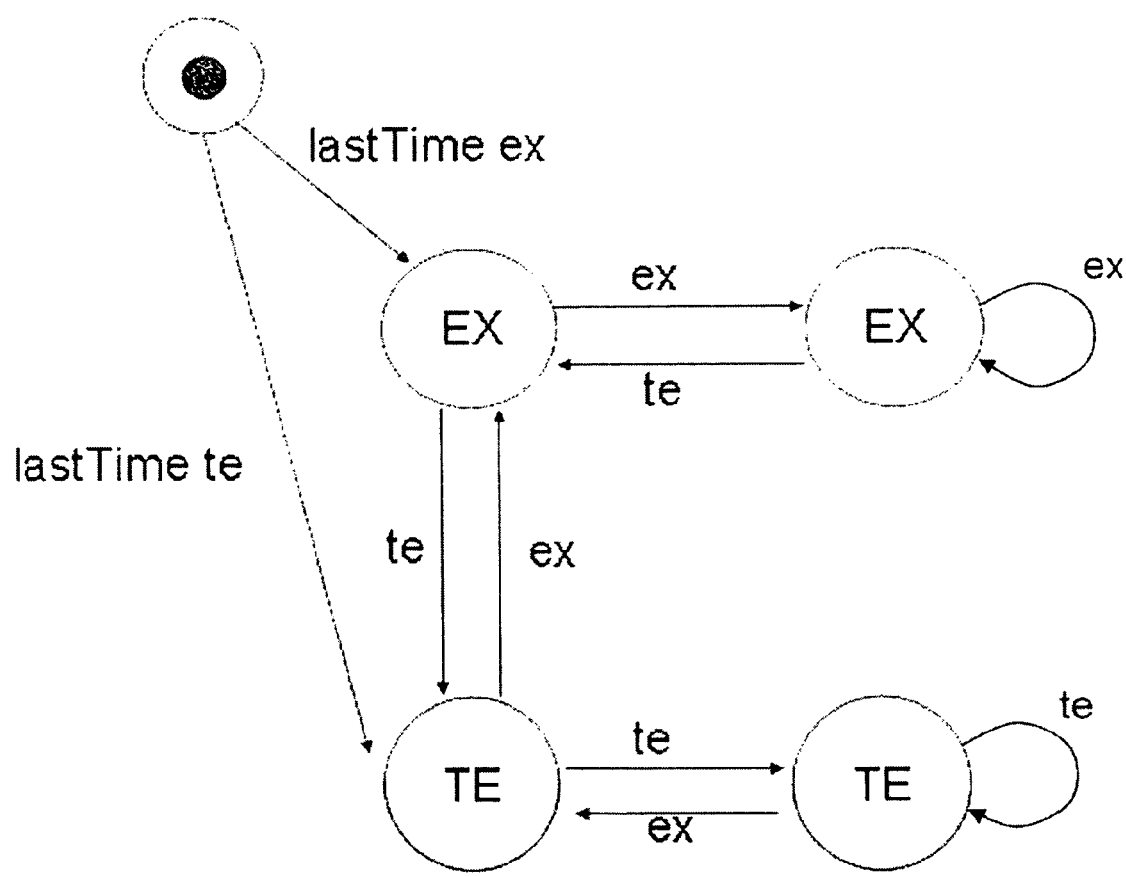
FIG. 4 illustrates an example process for using target scores to determine the learning strategy with which to associate the next section, according to an example embodiment of the present invention.

FIG. 4 illustrates an example embodiment of the present invention in which the system interprets user feedback using a state machine. In this example, state TE indicates that the current section is theory-based, and transition te indicates that the previous section feedback favored theory-based learning. Similarly, state EX indicates that the current section is example-based, and transition ex indicates that that the previous section feedback favored example-based learning. Initial transition lastTime te indicates that the first section should be theory-based, as for example based on information stored from a previous session. Likewise, initial transition lastTime ex indicates that the first section should be example-based, as for example based on information stored from a previous session. In this example, once two or more consecutive feedbacks have indicated that example-based training is more appropriate, the system will require two or more consecutive feedbacks favoring theory-based training to switch from example-based to theory-based training.

In addition to the methods described above, the present invention also contemplates other ways to interpret user feedback, such as through fuzzy logic, artificial neural networks, or other math algorithms or state machines to determine a pattern which the system may use to predict optimal learning strategies.

The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored in a machine readable medium or transmitted by a data signal embodied in a carrier waive over a transmission medium or a communication link.

The "machine readable medium" may include any medium that can store and/or transfer information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. The present embodiments are therefore to be considered in all respects as illustrative and not restrictive. The scope of the invention is indicated by appended claims rather than by foregoing description, and all changes that come within the meaning and range of equivalency of the claims are therefore intended to be embraced therein.

What is claimed is:

1. A computer-based training system comprising:
    a display;
    a processor; and
    a memory coupled to the processor, the memory storing instructions adapted to be executed by the processor to:
        present training sections associated with at least one first learning strategy,
        gather cumulative quantitative data about the training sections with respect to a user-entity, wherein gathering cumulative quantitative data includes receiving user-entity scores that indicate an opinion of the user-entity for the training sections,
        evaluate the cumulative quantitative data to determine a difference between a predetermined target quantity and the cumulative quantitative data of the at least one first learning strategy for the training sections,
        select at least one second learning strategy based on whether the determined difference between the predetermined target quantity and the cumulative quantitative data of the at least one first learning strategy exceeds a threshold,
        present a subsequent training section associated with the at least one second learning strategy to the user-entity if the determined difference exceeds the threshold, and
        wherein the first and second learning strategies are selected from the group consisting of example-based and theory-based learning strategies.

2. The computer-based training system of claim 1, wherein the memory stores information specific to the user-entity.

3. The computer-based training system of claim 2, wherein the user-entity specific information includes the second learning strategy.

4. The computer-based training system of claim 1, wherein the opinion of the user-entity of the first-training section includes an opinion of the user-entity of how well the first training section explained concepts taught in the first training section.

5. The computer-based training system of claim 1, wherein gathering quantitative data about the first training section with respect to the user-entity includes:
    providing a content mastery test having at least one objective question about a concept taught in the first training section; and
    calculating a content mastery test score based on a number of questions that the user-entity answered correctly.

6. The computer-based training system of claim 5, wherein the at least one objective question is directed toward at least one learning strategy.

7. The computer-based training system of claim 1, wherein gathering quantitative data about the first training section with respect to the user-entity includes recording the amount of time that the user-entity requires to complete the first training section.

8. The computer-based training system of claim 1, wherein evaluating the quantitative data to determine the difference between the predetermined target quantity and the quantitative data for the user-entity of the at least one first learning strategy includes comparing the gathered quantitative data with at least one stored value to determine a preferred learning strategy associated with the user-entity.

9. The computer-based training system of claim 8, wherein the at least one stored value includes quantitative data previously gathered from at least one other user-entity.

10. The computer-based training system of claim 8, wherein the at least one stored value includes quantitative data previously gathered about at least one other training section.

11. The computer-based training system of claim 8, wherein evaluating the quantitative data to determine the difference between the predetermined target quantity and the quantitative data for the user-entity of the at least one first learning strategy further includes comparing stored quantitative data previously gathered from the user-entity with stored quantitative data previously gathered from at least one other user-entity.

12. The computer-based training system of claim 11, wherein the at least one stored value includes a sum of another stored value and the difference between the gathered quantitative data and the predetermined target quantity.

13. The computer-based training system of claim 8, wherein selecting the at least one second learning strategy includes selecting the preferred learning strategy associated with the user-entity.

14. The computer-based training system of claim 8, wherein selecting the at least one second learning strategy includes selecting the output of applying the preferred learning strategy associated with the user-entity to a stored state-machine model.

15. A computer-implemented training method, comprising:
    presenting training sections associated with at least one first learning strategy;
    gathering cumulative quantitative data about the first training sections with respect to a user-entity, wherein gathering cumulative quantitative data includes receiving user-entity scores that indicate an opinion of the user-entity for the first training sections;
    evaluating the cumulative quantitative data to determine a difference between a predetermined target quantity and the gathered cumulative quantitative data of the at least one first learning strategy for the training sections;
    selecting at least one second learning strategy based on the whether determined difference between the predetermined target quantity and the gathered cumulative quantitative data of the at least one first learning strategy exceeds a threshold;

presenting a subsequent training section associated with the at least one second learning strategy to the user-entity if the determined difference exceeds the threshold, and wherein the first and second learning strategies are selected from the group consisting of example-based and theory based learning strategies.

16. The method of claim 15, wherein the score from the user-entity indicates an opinion of the user-entity of how well the first training section explained concepts taught in the first training section and gathering quantitative data about the first training section with respect to the user-entity includes:

providing a content mastery test having at least one objective question about a concept taught in the first training section; and calculating a content mastery test score based on a number of questions that the user-entity answered correctly, wherein the at least one objective question is directed toward at least one learning strategy.

17. The method of claim 16, wherein evaluating the quantitative data to determine the difference between the predetermined target quantity and the gathered quantitative data for the user-entity of the at least one first learning strategy includes comparing the gathered quantitative data with at least one stored value to determine a preferred learning strategy associated with the user-entity, wherein the at least one stored value includes at least one of: quantitative data previously gathered from at least one other user-entity, quantitative data previously gathered about at least one other training section, the predetermined target quantity, a sum of another stored value and the difference between the gathered quantitative data and the predetermined target quantity.

* * * * *